G. H. LESTER.
Milk-Can.
No. 195,898.
Patented Oct. 9, 1877.
Fig. 1.
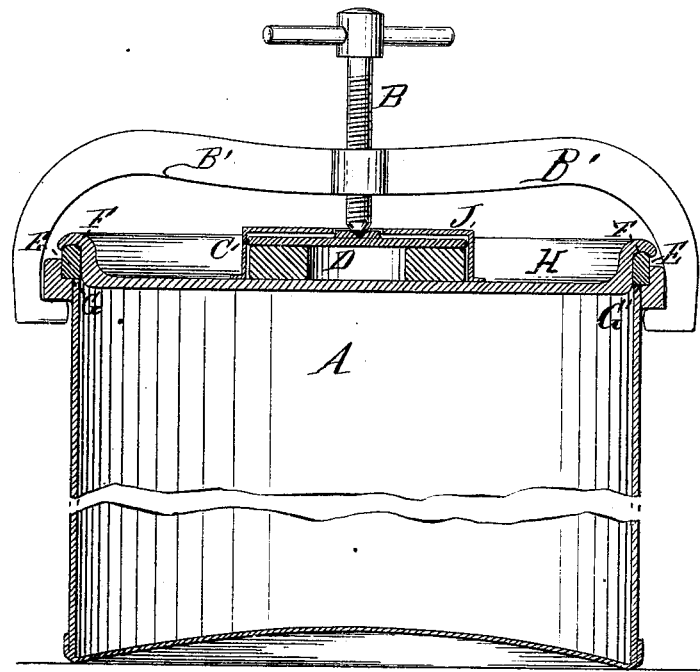
Fig. 3.
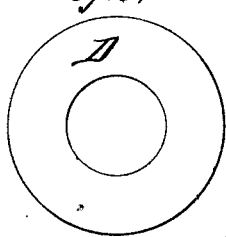
Fig. 2.
Fig. 4.
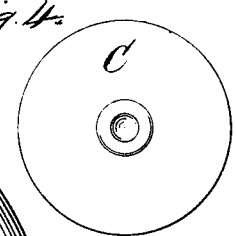
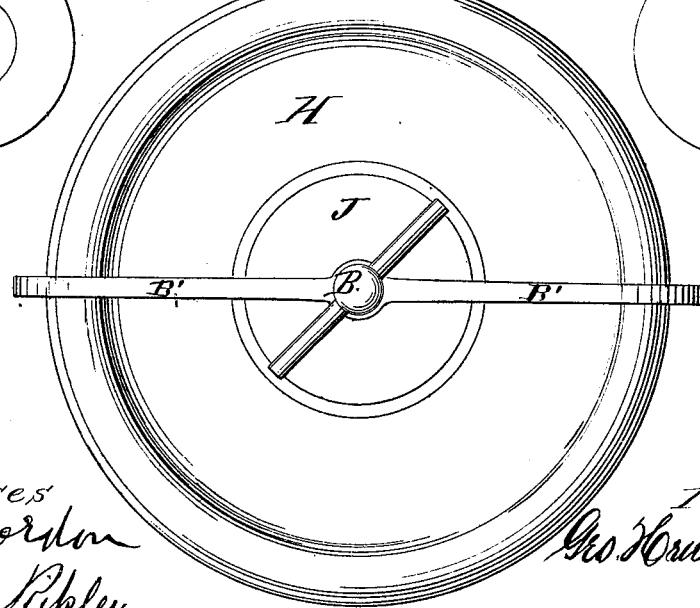
Witnesses
G. J. Gordon
John W. Ripley
Inventor
Geo. Henry Lester.

UNITED STATES PATENT OFFICE.

GEORGE H. LESTER, OF BROOKLYN, NEW YORK.

IMPROVEMENT IN MILK-CANS.

Specification forming part of Letters Patent No. 195,898, dated October 9, 1877; application filed December 20, 1876.

*To all whom it may concern:*

Be it known that I, GEORGE HENRY LESTER, of Brooklyn, Kings county, and State of New York, have invented a new and useful Improvement in Milk-Cans; and I hereby declare that the following is a full, clear, and exact description thereof, reference being had to the accompanying drawings, making a part of this specification, and the letters of reference marked thereon, in which the same letter represents the same thing in each figure.

Figure 1 is a vertical central section of my improved can; Fig. 2, a top view of the same; Fig. 3, a view of the rubber spring; Fig. 4, a top view of the washer.

A represents the can; B, the screw; C, the metallic washer; B', the yoke which binds the lid upon the can; D, the rubber spring; E, the rubber gasket; F, the concave groove in the cover of the can; G, the recess at the top of the can; H, the can-cover; J, the metallic jacket.

My invention is an improvement upon the milk-can patented to my father, John Henry Lester, November 16, 1875; and its object is to more perfectly secure the milk from movement within the vessel that contains it during transportation.

It has been found in practice that a variation of ten degrees either way from the temperature at which milk is secured by pressure within an air-tight can causes the milk to expand sufficiently to sometimes escape, in spite of the gasket, beneath the lid, or so contracts the milk as to leave a space between the milk and the bottom of the cover, thereby permitting such movement of the milk, when carried about in cars and wagons, as to seriously interfere with the full benefits derivable from the process of milk transport under pressure. I accomplish the end desired by inclosing in jacket J, on the top of cover H, the rubber spring D, with metallic washer C upon it.

The action is as follows: The can being filled entirely full with milk, and the cover placed upon the milk, with rubber gasket E in its place in groove F, the bail is tightened by screw B pressing on yoke B', which rests on washer C, above rubber spring D, sufficiently to exclude all the air between the milk and the cover, which air escapes between the washer in F and the top of the can before they come together, and so, on further compression, the milk is made practically immovable within the can. If the milk expands and lifts the cover, the rubber spring yields to the pressure, and returns the cover to firm contact with the milk if the milk contracts again, as it also holds it in close contact if the milk contracts in the first instance. In either event the milk is held solid, so that it will not churn by the agitation of its particles.

What I claim as my invention, and desire to secure by Letters Patent, is—

The combination of can A, having an outward flange recessed at and on the inside of its top, and of less depth than the uncompressed washer, the cover H, of less diameter than the cover, and with no concavity in its bottom, and provided in its periphery with means for holding an elastic gasket above the plane of its bottom, the gasket J, washer G, and spring D, with the usual yoke and screw, as and for the purposes set forth.

GEO. HENRY LESTER.

Witnesses:
S. J. GORDON,
JOHN W. RIPLEY.